(12) United States Patent
Farooq et al.

(10) Patent No.: US 11,312,325 B2
(45) Date of Patent: Apr. 26, 2022

(54) SEAT SUPPORTED AIRBAG

(71) Applicant: Ford Global Technologies, LLC, Dearborn, MI (US)

(72) Inventors: S. M. Iskander Farooq, Novi, MI (US); Mohammad Omar Faruque, Ann Arbor, MI (US); Dean M. Jaradi, Macomb, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/923,226

(22) Filed: Jul. 8, 2020

(65) Prior Publication Data

US 2021/0009068 A1 Jan. 14, 2021

Related U.S. Application Data

(60) Provisional application No. 62/872,814, filed on Jul. 11, 2019.

(51) Int. Cl.
| | | |
|---|---|---|
| *B60R 21/207* | (2006.01) | |
| *B60N 2/64* | (2006.01) | |
| *B60R 21/264* | (2006.01) | |
| *B60R 21/2338* | (2011.01) | |
| *B60R 21/231* | (2011.01) | |

(52) U.S. Cl.
CPC .............. *B60R 21/207* (2013.01); *B60N 2/64* (2013.01); *B60R 21/2338* (2013.01); *B60R 21/264* (2013.01); *B60R 2021/23146* (2013.01)

(58) Field of Classification Search
CPC . B60R 21/207; B60R 21/264; B60R 21/2338; B60R 2021/23146; B60R 2021/23388; B60R 2021/161; B60N 2/64; B60N 2/143
See application file for complete search history.

(56) References Cited

U.S. PATENT DOCUMENTS

| | | | |
|---|---|---|---|
| 4,592,523 A * | 6/1986 | Herndon | ................ B64D 25/02 |
| | | | 244/122 AG |
| 6,308,982 B1 | 10/2001 | Wallner et al. | |
| 6,431,588 B1 | 8/2002 | Bayley et al. | |
| 9,132,798 B2 * | 9/2015 | Yasuoka | ................ B60R 21/233 |
| 9,428,138 B2 * | 8/2016 | Farooq | ................. B60R 21/216 |
| 9,533,651 B1 | 1/2017 | Ohno et al. | |
| 9,573,553 B2 | 2/2017 | Ko et al. | |
| 10,112,570 B2 | 10/2018 | Barbat et al. | |
| 10,471,920 B2 * | 11/2019 | Dry | ....................... B60R 21/233 |
| 10,710,539 B2 * | 7/2020 | Cho | ....................... B60R 21/207 |
| 10,926,733 B2 * | 2/2021 | Dry | ....................... B60R 21/207 |
| 10,967,826 B2 * | 4/2021 | Henriksson | ........... B60R 21/207 |

(Continued)

FOREIGN PATENT DOCUMENTS

| | | | |
|---|---|---|---|
| JP | 2008081002 A | 4/2008 | |
| KR | 101724965 B1 * | 4/2017 | ....... B60R 21/23138 |

*Primary Examiner* — Drew J Brown
(74) *Attorney, Agent, or Firm* — Frank A. MacKenzie; Bejin Bieneman PLC (57) ABSTRACT

An assembly includes a seat bottom and a seat back extending upwardly from the seat bottom. An airbag is supported by the seat back and is inflatable to an inflated position above the seat. A pyrotechnic actuator is mounted to the seat bottom and is connected to the airbag. When the airbag is inflated to the inflated position, the pyrotechnic actuator pulls the airbag toward the seat bottom.

19 Claims, 6 Drawing Sheets

(56) References Cited

U.S. PATENT DOCUMENTS

| | | | |
|---|---|---|---|
| 2014/0300088 A1* | 10/2014 | Fukawatase | B60R 21/08 280/729 |
| 2019/0071046 A1 | 3/2019 | Dry et al. | |
| 2019/0248322 A1* | 8/2019 | Herzenstiel | B60R 21/207 |
| 2020/0114857 A1* | 4/2020 | Jaradi | B60R 21/207 |
| 2020/0164828 A1* | 5/2020 | Park | B60R 21/207 |
| 2020/0317154 A1* | 10/2020 | Choi | B60R 21/013 |
| 2021/0039578 A1* | 2/2021 | Rupp | B60R 21/231 |

* cited by examiner

SEAT SUPPORTED AIRBAG

CROSS-REFERENCE TO RELATED APPLICATION

This patent application claims priority to U.S. Provisional Patent Application No. 62/872,814 filed on Jul. 11, 2019, which is hereby incorporated by reference in its entirety.

BACKGROUND

A vehicle may include a variety of airbags that can deploy during a vehicle impact to control the kinematics of an occupant of the vehicle. The airbag may be a component of an airbag assembly including a housing supporting the airbag and an inflator in fluid communication with the airbag for inflating the airbag from an uninflated position to an inflated position. Airbag assemblies may be supported by a seat of the vehicle, a steering wheel of the vehicle, an instrument panel of the vehicle, a headliner of the vehicle, etc.

The vehicle may include an impact sensing system in communication with the airbag assembly for sensing the vehicle impact and instructing the inflator to inflate the airbag when the vehicle impact is sensed. The impact sensing system may sense a direction of the impact and may selectively inflate, or not inflate, certain airbags of the vehicle or extensions of the airbag based on the type and magnitude of impact that is sensed, e.g., based on direction, magnitude, etc.

An autonomous vehicle may be autonomously operated, allowing occupants of the vehicle to ride in the vehicle without monitoring the operation of the vehicle. The autonomous vehicle may include rotatable seats so that the occupant may choose the direction the seat faces, e.g., facing vehicle-forward, vehicle-rearward, cross-vehicle, etc. This, for example, may allow the occupants of the seats to face each other and to interact during operation of the vehicle. There remains an opportunity to design airbag assemblies that account for the rotatability of the seat assemblies.

DETAILED DESCRIPTION

An assembly includes a seat bottom, a seat back extending upwardly from the seat bottom, an airbag supported by the seat back and inflatable to an inflated position above the seat bottom, and a pyrotechnic actuator mounted to the seat bottom and connected to the airbag.

The pyrotechnic actuator may be connected to a top of the airbag and may be configured to pull the airbag toward the seat bottom. The pyrotechnic actuator may be connected to a forward end of the airbag.

The pyrotechnic actuator may be operable to pull the airbag toward the seat bottom. The assembly may include a track on the seat bottom extending away from the seat back, the airbag including a forward end slidably engaged with the track and spaced from the seatback along the track in the inflated position.

The assembly may include a tether extending from the pyrotechnic actuator to the airbag. The pyrotechnic actuator may include a spool engaged with the tether. The pyrotechnic actuator may include a pyrotechnic charge designed to rotate the spool. The assembly may include a post on the seat bottom, the tether turning along the post between the pyrotechnic actuator and the airbag.

The assembly may include a computer having a processor and memory storing instructions executable by the processor to actuate the pyrotechnic actuator after initiation of inflation of the airbag. The memory stores instructions executable by the processor to initiate inflation of the airbag.

The seat back has a top and the airbag extends from the top in the inflated position. The seat back has a bottom at the seat bottom and a midpoint between the top and the bottom, and the airbag may extend below the midpoint in the inflated position. The airbag may have a first leg and a second leg spaced from the first leg with a cavity therebetween, and in the inflated position the first leg and the second leg each have a bottom edge disposed between the bottom of the seat back and the midpoint of the seat back.

The airbag has a top portion at the top of the seat back, and a first leg and a second leg extending from the top portion toward the seat bottom on opposite sides of the cavity. The first leg and the second leg may each include a bottom edge distal to the top portion, and in the inflated position the bottom edges are disposed between the bottom of the seat back and a midpoint of the seat back.

The airbag may have a cavity with an opening facing the seat bottom and away from the seat back in the inflated position. The airbag in the inflated position has a forward end spaced from the seat back and extending along the cavity, and an inner surface extending along the cavity from the forward end to the seat back. The assembly may include a tether extending from the pyrotechnic actuator to the forward end.

The assembly may include a track on the seat bottom extending away from the seat back, the airbag including a forward end slidably engaged with the track and spaced from the seatback in the inflated position.

With reference to the Figures, wherein like numerals indicate like parts throughout the several views, a vehicle 11 includes a seat assembly 10 having a seat bottom 14 and a seat back 12 extending upwardly from the seat bottom 14. An airbag 16 is supported by the seat back 12 and is inflatable to an inflated position above the seat bottom 14. A pyrotechnic actuator 118, 218 is mounted to the seat bottom 14 and is connected to the airbag 16.

The pyrotechnic actuator 118, 218 is deployable to pull the airbag 16 toward the seat bottom 14. After initiation of inflation of the airbag 16, the pyrotechnic actuator 118, 218 pulls the airbag 16 toward the seat bottom 14 with the occupant, e.g., the head of the occupant, between the seat back 12 and the airbag 16.

In the example shown in the Figures and described below, the airbag 16 in the inflated position defines a cavity 20 with an opening 30 facing the seat bottom 14 and away from the seat back 12. As the airbag 16 inflates, the airbag 16 envelopes the occupant with the occupant in the cavity 20. As the pyrotechnic actuator 118, 218 pulls the airbag 16 downwardly, the cavity 20 receives the occupant, e.g., the head of the occupant, with the airbag 16 in front of the occupant and extending along the sides of the occupant to the seat back 12.

In the example shown in the Figures and described below, the seat assembly 10 is rotatable to face various directions in the vehicle 11. Since the airbag 16 envelopes the occupant, the airbag 16 may be inflated to the inflated position in any rotational position of the seat assembly 10 and in any direction of vehicle impact.

The vehicle 11 may be an autonomous vehicle. Autonomous vehicles use a variety of sensors and computers to navigate the vehicle 11 to a destination with various levels of input from a human driver. A computer can be programmed to operate the vehicle 11 independently of the intervention of a human driver, completely or to a lesser degree. The computer may be programmed to operate the propulsion, brake system, steering, and/or other vehicle systems based at least in part on data received from the sensor. For the purposes of this disclosure, autonomous operation means the computer controls the propulsion, brake system, and steering without input from a human driver.

Figure 1:
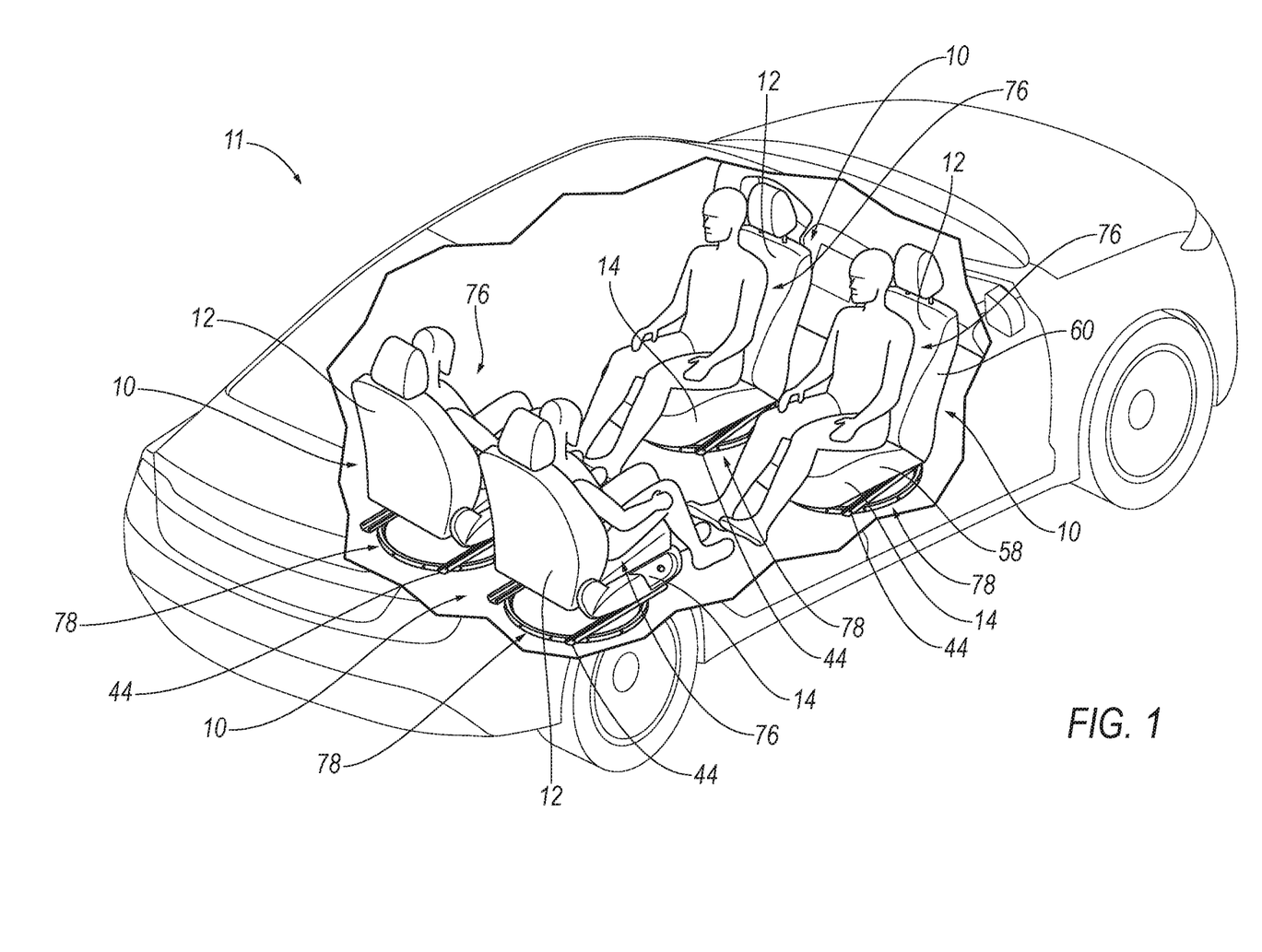
FIG. 1 is a cut-away view of a vehicle.

With reference to FIG. 1, the vehicle 11 includes a passenger cabin to house occupants, if any, of the vehicle 11. The passenger cabin includes one or more of the seat assemblies 10. The seat assembly 10 is shown to be a bucket seat, but the seat assemblies 10 may be other types. The position and orientation of the seat assemblies 10 and components thereof may be adjustable.

The seat back 12 may be supported by the seat bottom 14 and may be stationary or movable relative to the seat bottom 14. The seat bottom 14 and the seat back 12 may each include a frame 54, 56 (FIG. 2) and a covering 58, 60 (FIG. 1) supported on the frame 54, 56. The seat assembly 10 is shown n FIGS. 3-5B with portion of the covering 56, 58 removed for illustrative purposes.

The frame 54, 56 may include tubes, beams, etc. The frame 54, 56 may be any suitable plastic material, e.g., carbon fiber reinforced plastic (CFRP), glass fiber-reinforced semi-finished thermoplastic composite (organosheet), etc. As another example, some or all components of the frame 54, 56 may be a suitable metal, e.g., steel, aluminum, etc. The covering 58, 60 may include upholstery and padding. The upholstery may be cloth, leather, faux leather, or any other suitable material. The upholstery may be stitched in panels around the frame. The padding may be between the covering and the frame and may be foam or any other suitable material. The frame 54 of the seat bottom 14 and the frame 56 of the seat back 12 may be of the same or different construction and/or material. The covering 58 of the seat bottom 14 and the covering 60 of the seat back 12 may be of the same ore different construction and/or material.

Figure 3:
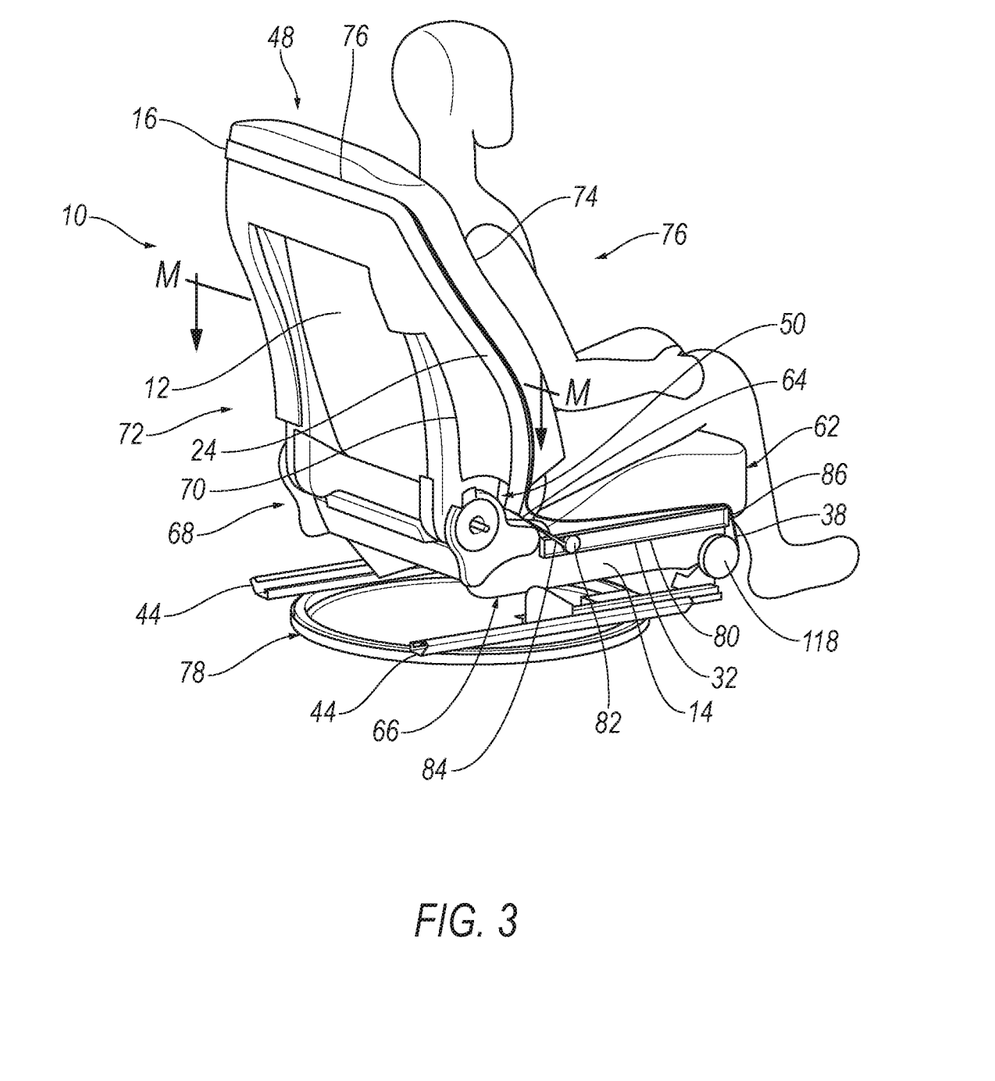
FIG. 3 is a perspective view of a portion of a seat assembly with an occupant seated thereon and with the airbag assembly in an uninflated position.

With reference to FIG. 3, the seat bottom 14 includes a front end 62 and a back end 64. The seat back 12 is at the back end 64. The front end 62 is spaced from the back end 64 and the seat back 12. The seat bottom 14 includes a first side 66 and a second side 68. The first side 66 and the second side 68 are spaced from each other and extend from the front end 62 to the back end 64. The seat back 12 extends from the first side 66 to the second side 68 at the back end 64.

The bottom 50 of the seat back 12 is at the seat bottom 14. The seat back 12 includes a first side 70 and a second side 72 each extending from the bottom 50 to the top 48. The seat back 12 includes a front 74 that faces an occupant seating area 76 of the seat assembly 10. The occupant seating area 76 is the area occupied by an occupant when seated on the seat bottom 14. The seat back 12 has a midpoint M located equidistant between the bottom 50 and the top 48, i.e. halfway such that the distance from the midpoint M to the bottom 50 is the same as the distance from the midpoint M to the top 48. The top 48 is above the midpoint M and the bottom 50 is below the midpoint M. Specifically, the top 48 may be, for example, a the uppermost 10% of the seat back 12 and the bottom 50 may be, for example, the lowermost 10% of the seat back 12.

The seat back 12 may include a tear seam (not shown) in the covering 60. The airbag 16 tears the tear seam when the airbag 16 is inflated. The tear seam may be located on the sides 70, 72 and the top 48 of the seat back 12. The tear seam may be a portion of the covering 60 having a lower strength than a surrounding area, e.g., perforations.

The seat assembly 10 is rotatable between different positions facing in different directions in the passenger cabin. In other words, the seat assembly 10 is rotatable about a generally vertical axis that extends through a floor and a ceiling of the vehicle 11. The occupant seating area 76 faces toward a facing direction of the seat assembly 10. FIG. 1 show the seat assemblies 10 in various positions. The seat assembly 10 may be rotatable between fixed positions, e.g., two fixed positions, or may be rotatable to an infinite number of positions, e.g., in 360 degrees.

The seat assembly 10 may include a rotation mechanism 78 to rotate the seat assembly 10. The rotation mechanism 78 may include rings that are rotatable relative to each other, as shown in FIGS. 3-5B. As another example, the seat assembly 10 may include a rotatable post. Alternatively, the seat assembly 10 may include any suitable structure for rotating the seat assembly 10 about a generally vertical axis.

The seat assembly 10 is lockable in various rotated positions. The occupant may selectively actuate the rotation mechanism 78 to lock the seat assembly 10, e.g., with a mechanical lever, an electronic solenoid lock, etc. The rotation mechanism 78 or other component of the seat assembly 10 may include a seat position sensor programmed to detect the position of the seat assembly 10.

The seat assembly 10 may include an adjustment track 44 for horizontal adjustment of the seat assembly 10. The seat assembly 10 is selectively slidable relative to the adjustment track 44. In other words, the occupant may slide the seat along the adjustment track 44 and may secure the seat to the adjustment track 44 at a selected position. For example, the occupant may actuate a motor (not shown) that moves the seat along the track 44.

Figure 6:
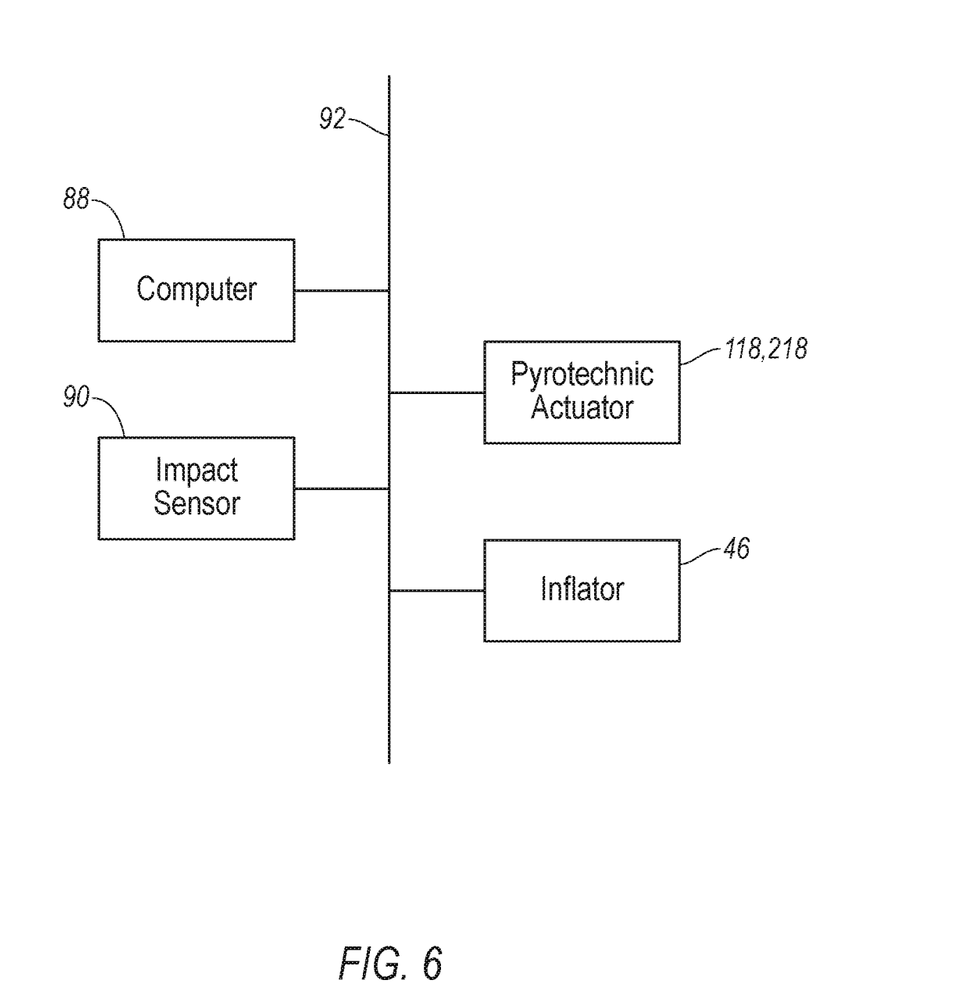
FIG. 6 is a block diagram of a system of the vehicle.

An airbag assembly 10 includes the airbag 16 and an inflator 46 (FIG. 6). The airbag 16 has an inflation chamber (not numbered). The inflator 46 is fluidly connected to the inflation chamber of the airbag 16. Upon receiving a signal, e.g., from a vehicle controller, the inflator 46 inflates the inflation chamber of the airbag 16 with an inflatable medium, such as a gas. Inflation medium provided from the inflator 46 inflates the airbag 16, causing the airbag 16 to unfold and/or unroll, rupturing the seat back 12 along the tear seam as the airbag 16 inflates.

The inflator 46 may be, for example, a pyrotechnic inflator that uses a chemical reaction to drive inflation medium to the airbag 16. The inflator 46 may be of any suitable type, for example, a cold-gas inflator.

Figure 2:
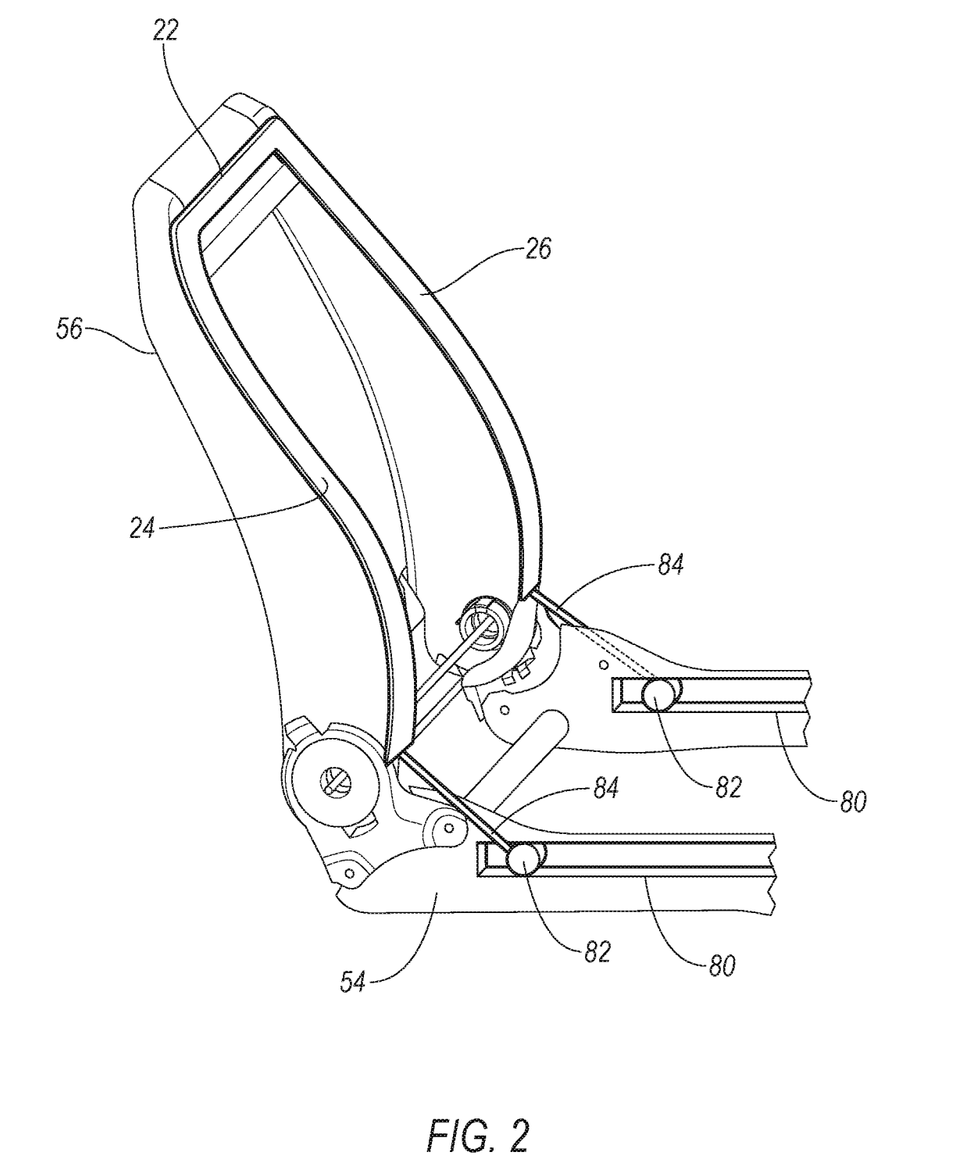
FIG. 2 is a perspective view of a portion of a seat assembly including a frame of a seat back, an airbag assembly, and a portion of a frame of a seat bottom.

With reference to FIGS. 2 and 3, the airbag 16 may be rolled and/or folded and attached directly the frame of the seat back 12. As another example, the airbag assembly 10 may include a housing that houses the airbag 16 and/or the inflator 46. The housing may be supported by the frame of the seat back 12. The housing may be of any suitable type and construction, e.g., a rigid polymer, a metal, a composite, or a combination of rigid materials. The housing may be configured to house the airbag 16 in an uninflated position and support the airbag 16 in an inflated position. The airbag 16 may be rolled and/or folded to fit within the housing.

With reference to FIG. 2, the airbag 16 may be U-shaped in the uninflated position. Specifically, the airbag 16 may have a top portion 22, a first leg 26, and a second leg 28. The top portion 22 is at the top 48 of the seat back 12 in the uninflated position. The first leg 26 and the second leg 28 are spaced from each other and both extend downwardly from the top portion 22 toward the seat bottom 14 in the uninflated position.

The airbag 16 is inflatable to an inflated position above the seat bottom 14, as shown in FIGS. 4A-5B. Specifically, the airbag 16 extends from the top 48 of the seat back 12 over the occupant seating area 76 in the inflated position. The airbag 16 extends from the top 48 along the sides 70, 72 of the seat back 12 toward the bottom 50 in the inflated position. Specifically, in the inflated position, the airbag 16 may extend from the top 48 to the seat bottom 14 and may abut the sides 66, 68 of the seat bottom 14. In the inflated position, the top portion 22 may extend away from the seat back 12 along a width of the top 48. The legs 26, 28 of the airbag 16 each include bottom edges 24 that extend away from the first side 70 and second side 72, respectively, of the seat back 12.

The cavity 20 includes an opening 30 that faces the seat bottom 14 and away from the seat back 12 in the inflated position. In other words, the opening 30 is spaced from the seat back 12 along the seat bottom 14. The opening 30 allows the airbag 16 to deploy over and around the occupant.

With reference to FIG. 3, the seat bottom 14 includes at least one track 32 that guides the airbag 16 in a direction from the back end 64 of the seat bottom 14 to the front end 66 of the seat bottom 62 as the airbag inflates. Specifically, the track 32 guides the airbag 16 along the occupant seating area 76. The airbag 16 is engaged with the track 32 to move along the track 32 as the airbag 16 inflates, as described further below. The track 32 extends away from the seat back 12. The track 32 may be, for example, fixed to the frame 54 of the seat bottom 14. In the example shown in the Figures, the seat bottom 14 includes two tracks 32, i.e., one track 32 at the first side 66 of the seat bottom 14 and another track 32 at the second side 68 of the seat bottom 14. In such an example the tracks 32 may be mirror images.

The airbag 16 is engaged with the track 32 to move along the track 32 as the airbag 16 inflates. For example, the airbag 16 includes a forward end 34 slidably engaged with the track 32 and spaced from the seat back 12 in the inflated position. Specifically, the airbag 16 may be slidably engaged with the track 32 at the bottom edges 24 of the legs 26, 28. As shown in FIG. 2, the forward end 34 of the airbag 16 is at an end of the track 32 closest to the seat back 12 when the airbag 16 is uninflated. When the airbag 16 inflates to the inflated position, the forward end 34 of the airbag 16 slides forwardly allowing the first leg 26 and the second leg 28 to extend away from the seat back 12. This forms the cavity 20 that receives the occupant.

In the example shown in the Figures, the track 32 includes an elongated slot 80. The elongated slot 80 is elongated along a direction from the back end 64 of the seat bottom 14 to the front end 66 of the seat bottom 14. The airbag 16 is slidably engaged with the elongated slot 80 to move along the slot as the airbag 16 inflates. For example, the airbag assembly 10 may include a slider 82 slidably engaged with the elongated slot 80 and connected to the airbag 16. The slider 82 may be retained in the elongated slot 80 so that the slider 82 slides along the elongated slot 80 without disengaging the elongated slot 80. For example, the elongated slot 80 and/or the slider 82 may include features such as fingers, tangs, etc., that retain the slider 82 in the elongated slot 80. The elongated slot 80 and the slider 82 may be of any suitable materials, e.g., metal, plastic, etc.

The elongated slot 80 has a restricted end 86 at the front end 66 of the seat bottom 14. The restricted end 86 is sized to stop movement of the slider 82 as the airbag 16 moves the slider 82 along the elongated slot 80 during inflation of the airbag. As an example, the restricted end 86 may be closed, as shown in the Figures.

The airbag 16 may include a tether 84 fixed to the slider 82. In such an example the tether 84 may be fixed to the forward end 34 of the airbag 16, e.g., at the bottom edge 24. The tether 84 may be fabric and, in such an example, may be of the same material type as the rest of the airbag 16.

With reference to FIGS. 4A-5C, in the inflated position, the forward end 34 of the airbag 16 is spaced from the seat back 12 and extends along the opening 30 of the cavity 20. An inner surface (not numbered) of the airbag 16 extends along the cavity 20 from the forward end 34 to the seat back 12. Accordingly, when the airbag 16 is in the inflated position, the occupant is enclosed by the inner surface to the front of the occupant and by the seat back 12 to the rear of the occupant. The inner surface may extend continuously from the forward end 34 to the seat back 12, i.e., the inner surface may be void of any gaps, apertures, mesh panels, etc. The forward end 34 extends from one bottom edge 24 to the other bottom edge 24. Specifically, the forward end 34 may have an arced shape from one bottom edge 24 to the other bottom edge 24.

The airbag 16 may be of any suitable airbag 16 material, for example, a woven polymer. For example, the airbag 16 may be formed of woven nylon yarn, for example, nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane.

As set forth above, the pyrotechnic actuator 118, 218 is mounted to the seat bottom 14 and is connected to the airbag 16. Specifically, the pyrotechnic actuator 118, 218 is mounted to the frame 54 of the seat bottom 14. The pyrotechnic actuator 118, 218 is operable to pull the airbag 16 toward the seat bottom 14. Specifically, the pyrotechnic actuator 118, 218 is connected to a forward portion of the airbag 16 (e.g., the forward end 34) and high on the airbag 16 (e.g., at the top portion 22) to pull the airbag 16 downwardly over the head of the occupant, as shown in FIGS. 4B and 5B. As an example, a tether 38 may extend from the pyrotechnic actuator 118, 218 to the airbag 16. For example, the tether 38 may extend from the pyrotechnic actuator 118, 218 to the forward end 34. Specifically, the tether 38 may be connected to the forward end 34 at the top portion 22 of the airbag 16. The tether 38 may be, for example, the same type of material as the airbag 16. As another example, the tether 38 may be a cable.

The pyrotechnic actuator 118, 218 is configured to pull the airbag 16 toward the seat bottom 14. Specifically, the pyrotechnic actuator 118, 218 pulls the airbag 16 down over the occupant, as shown in FIGS. 4B and 5B. The pyrotechnic actuator 118, 218 is actuated when the forward end 34 of the airbag 16 is deployed forward toward the front end 62 of the seat bottom 14, e.g., when the slider 82 is at or near the restricted end 86. Since the pyrotechnic actuator 118, 218 is connected to the forward end 34 of the airbag 16 at the top portion 22 by the tether 38, the pyrotechnic actuator 118, 218 pulls the top portion 22 downwardly in front of the occupant, as shown in FIGS. 4B and 5B.

Figure 4A:
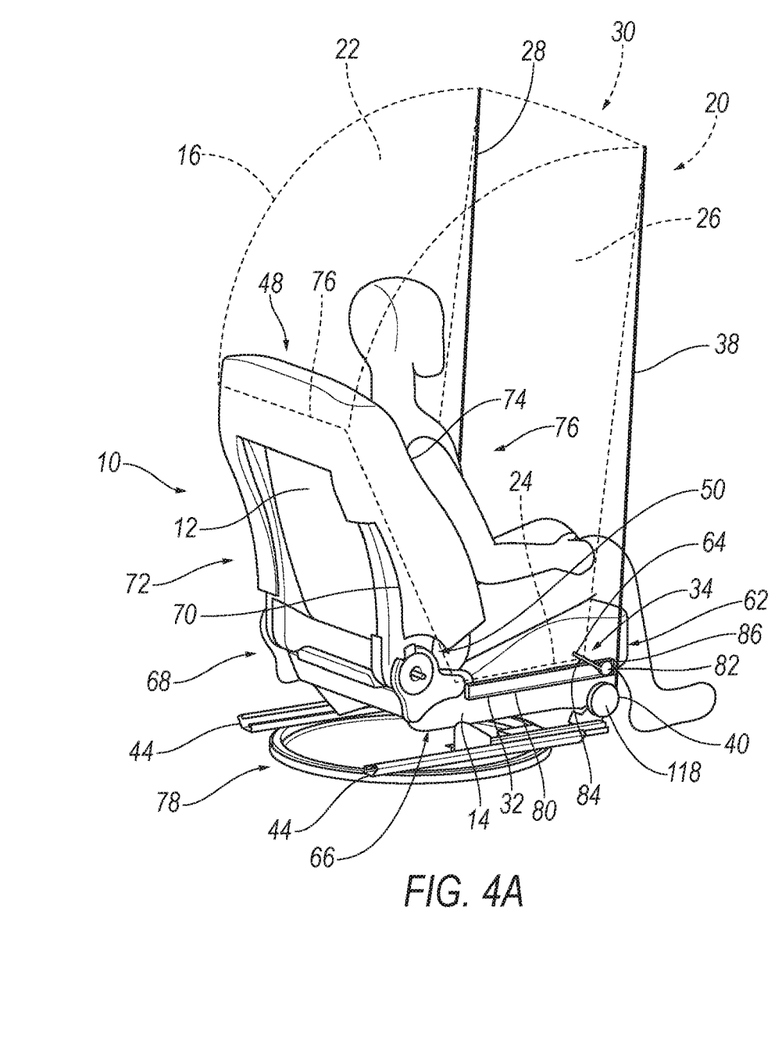
FIG. 4A is a perspective view of the seat assembly with one embodiment of the airbag assembly during inflation of the airbag assembly and prior to actuation of a pyrotechnic actuator.
Figure 4B:
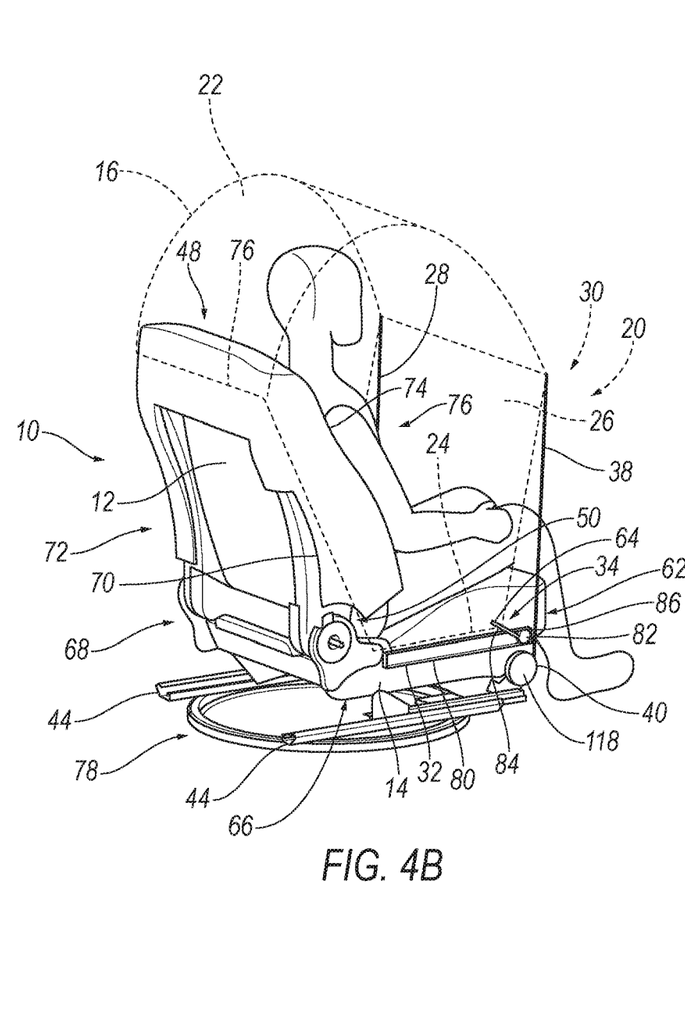
FIG. 4B is a perspective view of the seat assembly of FIG. 4A after actuation of the pyrotechnic actuator.
Figure 5A:
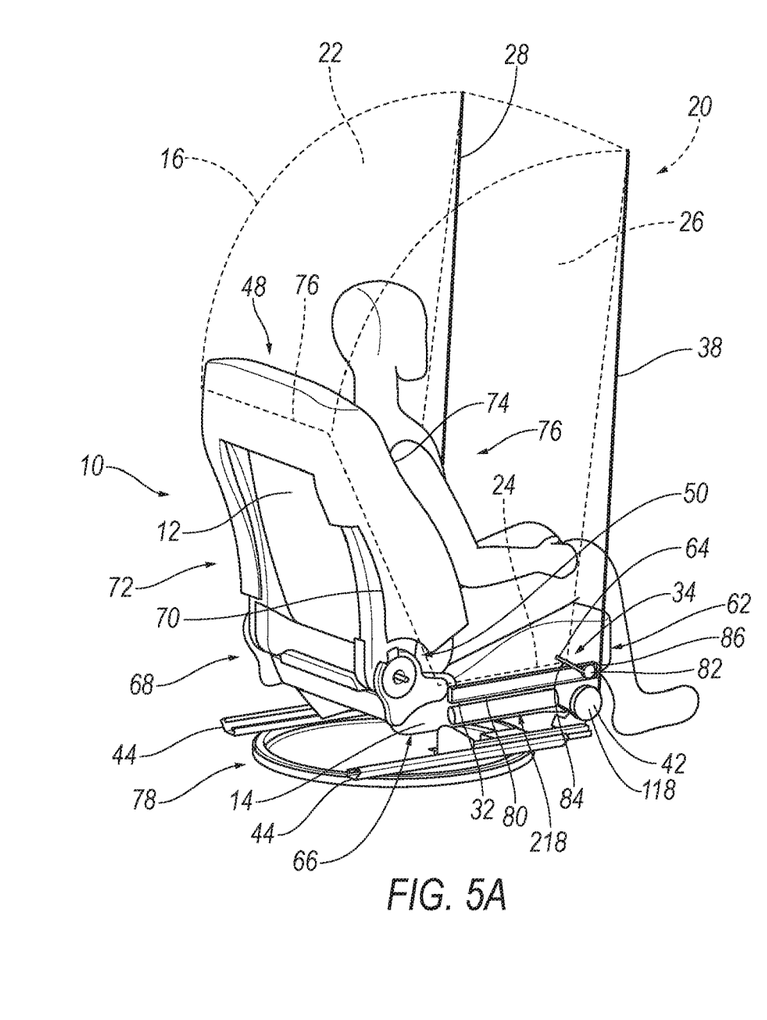
FIG. 5A is a perspective view of the seat assembly with another embodiment of the airbag assembly during inflation of the airbag assembly and prior to actuation of a pyrotechnic actuator.
Figure 5B:
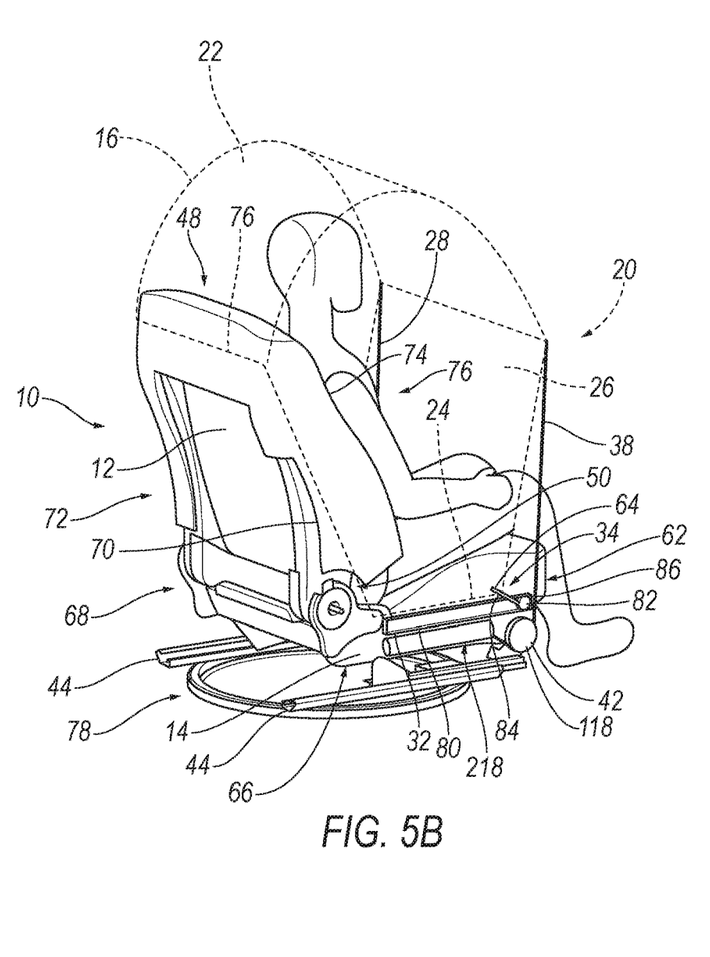
FIG. 5B is a perspective view of the seat assembly of FIG. 5A after actuation of the pyrotechnic actuator.

One example of the pyrotechnic actuator 118 is shown in FIGS. 4A-4B and another example of the pyrotechnic actuator 218 is shown in FIGS. 5A-5B. Common numerals are used to identify common features in FIGS. 4A-5B. The pyrotechnic actuator 118, 218 has at least one component that retracts to pull the airbag 16 toward the seat bottom 14.

With reference to FIGS. 4A-4B, the pyrotechnic actuator 118 may include a spool 40 supported on the seat bottom 14. Specifically, the spool 40 may be rotatably supported by the frame 54 of the seat bottom 14.

The spool 40 is engaged with the tether 38. Specifically, the tether 38 has an end fixed to the spool 40 so that the tether 38 is wound around the spool 40 when the spool 40 rotates. The spool 40 is actuatable to rotate relative to the frame 54 of the seat bottom 14. The spool 40 is configured to pull the airbag 16 toward the seat bottom 14. Specifically, when rotated, the tether 38 wraps around the spool 40 to pull the airbag 16 toward the seat bottom 14, as shown in FIG. 4B. The spool 40 is pyrotechnically actuated. Specifically, the spool 40 includes a pyrotechnic charge that is ignited to rotate the spool 40 relative to the frame 54 of the seat bottom 14. When instructed by a computer 88 (FIG. 6), the pyrotechnic charge detonates to rotate the spool 40.

With reference to FIG. 5A-5B, the pyrotechnic actuator 218 may linearly retract the tether 38. The pyrotechnic actuator 218 is configured to pull the airbag 16 toward the seat bottom 14. For example, in the example, shown in FIGS. 5A-5B, the assembly 10 may include a post 42 on the seat bottom 14. The tether 38 turns around the post 42 between the pyrotechnic actuator 218 and the airbag 16. When the pyrotechnic actuator 218 pulls the tether 38, the tether 38 moves along the post 42 and pulls the airbag 16 toward the seat bottom 14. The pyrotechnic actuator 218 in FIGS. 5A-5B is pyrotechnically actuated. Specifically, the pyrotechnic actuator 218 may include a cylinder and a piston and pyrotechnic charge in the cylinder. The piston is connected to the tether 38 and the pyrotechnic charge is ignited to slide the piston along the cylinder, i.e., moving the piston and the tether 38 relative to the frame 54 of the seat bottom 14. When instructed by the computer 88, the pyrotechnic charge detonates to move the piston.

The track 32, the pyrotechnic actuator 118, 218, and the tether 38 are configured to pull the airbag 16 over the occupant and toward the seat bottom 14 in front of the occupant after inflation of the airbag 16. Specifically, the since the restricted end 86 of the track 32 is at the front end 66 of the seat bottom 14, the tether is connected forwardly and high on the airbag (e.g., at the forward end 34 at the top portion 22), and the pyrotechnic actuator 118, 218 is configured to pull the airbag 16 toward the seat bottom 16, the forward end 34 of the airbag 16 moves toward the front end 66 of the seat bottom 14 and over the occupant when the airbag 16 is inflated and is then pulled downwardly over the occupant by the pyrotechnic actuator 118, 218.

The computer 88 is programmed to inflate the airbag 16 and to actuate the pyrotechnic actuator 118, 218. The computer 88 may be, for example, a restraints control module.

The vehicle 11 includes an impact sensor 90 in communication with the computer 88. The impact sensor 90 is programmed to detect an impact to the vehicle 11. The impact sensor 90 may be of any suitable type, for example, post-contact sensors such as accelerometers, pressure sensors, and contact switches; and pre-impact sensors such as radar, LIDAR, and vision-sensing systems. The vision systems may include one or more cameras, CCD image sensors, CMOS image sensors, etc. The impact sensor 90 may be located at numerous points in or on the vehicle 11.

The vehicle 11 may include a communication network 92. The communication network 92 includes hardware, such as a communication bus, for facilitating communication among vehicle 11 and assembly components such as the computer 88, the impact sensor 90, and the pyrotechnic actuator 118, 218. The communication network 92 may facilitate wired or wireless communication among the components in accordance with a number of communication protocols such as controller area network (CAN), Ethernet, WiFi, Local Interconnect Network (LIN), and/or other wired or wireless mechanisms. In the event of an impact, the impact sensor 90 may detect the impact and transmit a signal through the communication network 92 to the computer 88 and the computer 88 transmits a signal through the communication network 92 to actuate the inflation of the airbag 16.

The computer 88 may be a microprocessor-based controller implemented via circuits, chips, or other electronic components. For example, the computer 88 may include a processor, memory, etc. The memory of the computer 88 may include memory for storing instructions executable by the processor as well as for electronically storing data and/or databases The memory may store instructions executable by the processor actuate the pyrotechnic actuator 118, 218 after the initiation of inflation of the airbag 16. For example, the memory may store instructions executable by the processor to actuate inflation of the airbag 16 and then to actuation the pyrotechnic actuator 118, 218 after a time delay. The time delay may be a preset number stored in the memory. The memory, i.e., the same computer, may include instructions executable by the process to first inflate the airbag 16. Use of "in response to" indicates a causal relationship, not merely a temporal relationship.

Computing devices, such as the computer 88, generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

A computer-readable medium (also referred to as a processor-readable medium) includes any non-transitory (e.g., tangible) medium that participates in providing data (e.g., instructions) that may be read by a computer 88 (e.g., by a processor of a computer 88). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an engine control unit (ECU). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, computing modules, etc.), stored on computer readable media associated therewith (e.g., disks, memories, etc.). A computer program product may comprise such instructions stored on computer readable media for carrying out the functions described herein.

The adjectives "first" and "second" are used throughout this document as identifiers and are not intended to signify importance or order. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly comprising:
   a seat bottom and a seat back extending upwardly from the seat bottom;
   an airbag supported by the seat back and inflatable to an inflated position above the seat bottom;
   a pyrotechnic actuator mounted to the seat bottom and connected to the airbag; and
   a track on the seat bottom extending away from the seat back, the airbag including a forward end slidably engaged with the track and spaced from the seat back along the track in the inflated position.

2. The assembly of claim 1, wherein the pyrotechnic actuator is connected to a top of the airbag and is configured to pull the airbag toward the seat bottom.

3. The assembly of claim 2, wherein the pyrotechnic actuator is connected to the forward end of the airbag.

4. The assembly of claim 1, wherein the pyrotechnic actuator is operable to pull the airbag toward the seat bottom.

5. The assembly of claim 1, further comprising a tether extending from the pyrotechnic actuator to the airbag.

6. The assembly of claim 5, wherein the pyrotechnic actuator includes a spool engaged with the tether.

7. The assembly of claim 6, wherein the pyrotechnic actuator includes a pyrotechnic charge designed to rotate the spool.

8. The assembly of claim 5, further comprising a post on the seat bottom, the tether turning along the post between the pyrotechnic actuator and the airbag.

9. The assembly of claim 1, further comprising a computer having a processor and memory storing instructions executable by the processor to actuate the pyrotechnic actuator after initiation of inflation of the airbag.

10. The assembly of claim 9, wherein the memory stores instructions executable by the processor to initiate inflation of the airbag.

11. The assembly of claim 1, wherein the seat back has a top and the airbag extends from the top in the inflated position.

12. The assembly of claim 11, wherein the seat back has a bottom at the seat bottom and a midpoint between the top and the bottom, and the airbag extends below the midpoint in the inflated position.

13. The assembly of claim 12, wherein the airbag has a first leg and a second leg spaced from the first leg with a cavity therebetween, and in the inflated position the first leg and the second leg each have a bottom edge disposed between the bottom of the seat back and the midpoint of the seat back.

14. The assembly of claim 11, wherein the airbag has a top portion at the top of the seat back, and a first leg and a second leg extending from the top portion toward the seat bottom on opposite sides of the cavity.

15. The assembly of claim 14, wherein the first leg and the second leg each include a bottom edge distal to the top portion, and in the inflated position the bottom edges are disposed between the bottom of the seat back and a midpoint of the seat back.

16. The assembly of claim 1, wherein the airbag has a cavity with an opening facing the seat bottom and away from the seat back in the inflated position.

17. The assembly of claim 16, wherein the airbag in the inflated position has a forward end spaced from the seat back and extending along the cavity, and an inner surface extending along the cavity from the forward end to the seat back.

18. The assembly of claim 17, further comprising a tether extending from the pyrotechnic actuator to the forward end.

19. An assembly comprising:
   a seat bottom and a seat back extending upwardly from the seat bottom;
   an airbag supported by the seat back and inflatable to an inflated position above the seat bottom;
   a pyrotechnic actuator mounted to the seat bottom and connected to the airbag;
   a tether extending from the pyrotechnic actuator to the airbag; and
   a post on the seat bottom, the tether turning along the post between the pyrotechnic actuator and the airbag.

* * * * *